United States Patent [19]

Sakaki et al.

[11] Patent Number: 4,701,837
[45] Date of Patent: Oct. 20, 1987

[54] LIGHT-TRANSMISSIVE RECORDING MEDIUM HAVING A CROSSLINKED-POLYMER INK RECEIVING LAYER

[75] Inventors: Mamoru Sakaki, Atsugi; Ryuichi Arai, Sagamihara, both of Japan

[73] Assignee: Canon Kabushiki Kaisha, Tokyo, Japan

[21] Appl. No.: 833,560

[22] Filed: Feb. 27, 1986

[30] Foreign Application Priority Data

Mar. 4, 1985 [JP] Japan .................................. 60-041303

[51] Int. Cl.$^4$ ............................................. G01D 15/34
[52] U.S. Cl. .................................. 346/135.1; 346/1.1; 428/195; 428/480
[58] Field of Search .......................... 346/1.1, 135.1; 428/195, 207, 480, 483, 500

[56] References Cited

U.S. PATENT DOCUMENTS

| | | |
|---|---|---|
| 4,446,174 | 5/1984 | Maekawa .................... 346/135.1 X |
| 4,503,111 | 3/1985 | Jaeger ......................... 346/135.1 X |
| 4,528,242 | 7/1985 | Burwasser .................... 346/135.1 X |
| 4,550,053 | 10/1985 | Arai ............................. 346/135.1 X |
| 4,564,560 | 1/1986 | Tani ............................. 346/135.1 X |
| 4,592,951 | 6/1986 | Viola ........................... 346/135.1 X |
| 4,636,805 | 1/1987 | Toganoh et al. ..................... 346/1.1 |
| 4,642,247 | 2/1987 | Mouri et al. .......................... 427/214 |

*Primary Examiner*—Joseph W. Hartary
*Attorney, Agent, or Firm*—Fitzpatrick, Cella, Harper & Scinto

[57] ABSTRACT

A light-transmissive recording medium is provided which has an ink receiving layer formed mainly of a water-soluble polymer and a crosslinking agent on a light-transmissive substrate, wherein the polymer constituting said ink receiving layer has a crosslinking degree within the range of from the crosslinking degree satisfying the water resistance of the ink receiving layer in JIS K 5400 to the crosslinking degree giving the ink receiving capacity of 0.2 $\mu$l/cm$^2$ in the ink receiving layer. A recording method employing the above-mentioned recording medium is also provided.

33 Claims, 1 Drawing Figure

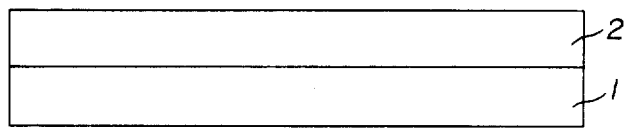

LIGHT-TRANSMISSIVE RECORDING MEDIUM HAVING A CROSSLINKED-POLYMER INK RECEIVING LAYER

BACKGROUND OF THE INVENTION

1. Field of the Invention

This invention relates to a light-transmissive recording medium to be used suitably for ink jet recording, particularly to a light-transmissive recording medium satisfying both water resistance of the recorded image and ink absorption characteristic.

2. Related Background Art

Ink jet recording performs recording by generating small droplets of ink according to various ink (recording liquid) discharging systems, such as the electrostatic attraction system, the system of giving mechanical vibration or displacement to ink by use of a piezoelectric element, the system of utilizing the pressure of bubbles formed by heating, permitting the droplets to fly and to attach a part or whole thereof onto a recording medium such as paper. This method is now attracting attention as a recording method which generates less noise and is capable of performing high speed printing and multi-color printing.

As the ink for ink jet recording, there have been used those composed mainly of water primarily for the reasons of safety and recording characteristics, and in most cases, a polyhydric alcohol is added for prevention of clogging of nozzles and improvement of discharging stability.

As the recording medium to be used for the ink jet recording method, there have been employed recording media comprising a porous ink receiving layer provided on a conventional paper or a substrate known as the ink recording paper.

However, as the ink jet recording is improved in performance such as speed-up or multi-colorization of recording and becomes wide-spread, higher and broader characteristics are becoming demanded also for the recording medium.

More specifically, the recording medium for ink jet recording for obtaining recorded images of high resolution and high quality is required to satisfy various basic requirements as follows:

(1) reception of ink onto the recording medium should be as rapid as possible;

(2) the ink attached later should not penetrate into the dot attached earlier, even when the ink dots overlap each other;

(3) ink droplets should not diffuse on the recording medium and should not give a larger ink dot diameter than is necessary;

(4) the shape of an ink dot should be approximate to a true circle and its circumference should be smooth;

(5) OD (optical density) of an ink dot should be high, without obscurity in the periphery of the dot; etc.

Further, for obtaining a recorded image quality of high resolution comparable to color photography by the multi-color ink jet recording method, the following performances are required in addition to the above requisite performances:

(6) the colorants of the ink should be excellent in color forming property;

(7) ink fixing characteristic should be excellent since the same number of liquid droplets as there are ink colors may be attached on one spot;

(8) the surface should have lustre;

(9) the degree of whiteness should be high.

Further, while the recorded images obtained by the ink jet recording method have been employed in the past exclusively for surface image observation, recording media suited for uses other than for surface image observation are becoming demanded with improvement in performances or wide usage of the ink jet recording device.

Uses of the recording medium other than for surface image observation may include those in which recorded images are projected onto a screen, etc. by means of an optical instrument such as a slide or an OHP (an overhead projector), etc. and those images are observed, color resolution plates during preparation of a positive plate for color printing, and a CMF (a color mosaic filter), etc. to be used for color display such as liquid crystal, etc.

In surface image observation, the diffused light of the recorded image is observed, while the transmitted light through the recorded images becomes a problem in the recording medium in other uses. Accordingly, light transmissivity, particularly excellent linear transmittance is required in addition to the requisite performances in general of the recording medium for ink jet recording.

However, until the present invention, no recording medium satisfying all of these requisite performances has yet been known.

In the prior art, it has been known to use a water-soluble polymer for formation of an ink receiving layer.

Such a recording medium, while it is excellent in ink absorption, becomes sticky on the surface of the ink receiving layer under highly humid conditions, whereby there are involved the problems such that it adheres to the delivery roller of the printer when mounted on a printer, thus failing to be conveyed, and also that the recording medium will be subject to blocking when placed one upon another.

It has been also known to make the ink receiving layer water-insoluble by addition of a water-resistance-improving agent into an ink receiving layer containing a water-soluble polymer and a pigment.

However, according to such a method, the water-soluble polymer is used merely as the binder for a pigment, etc., and the water-soluble polymer itself does not absorb and hold the ink.

Thus, when such a method is employed, the water-soluble polymer itself is made water-insoluble to give no stickiness; but, on the other hand, ink absorbability of the water-soluble polymer is also lost.

The water-absorbable polymer used for sanitary articles or paper diapers is also obtained by crosslinking a water-soluble polymer to make it water-insoluble. Such crosslinked polymer has no film forming property, and the water absorption characteristic is markedly lowered by the polyhydric alcohol, etc. contained in the ink. Thus, it was unsuitable for a recording method using of an ink.

SUMMARY OF THE INVENTION

Accordingly, an object of the present invention is to provide a light-transmissive recording medium for use in ink jet recording which is particularly excellent in water resistance and ink absorption characteristic.

Another object of the present invention is to provide a recording medium for use in color ink jet recording which is excellent in sharpness and surface lustre of recorded image, and also free from stickiness of the surface, blocking, etc. even under highly humid conditions.

Still another object of the present invention is to provide a light-transmissive recording medium for use in ink jet recording, which can be used for observation of transmitted light by means of an optical instrument such as a slide or an OHP, or which can be used for observation by projection of recorded images onto a screen, etc. by an optical instrument such as a slide, an OHP, etc., or for observation of transmitted light such as color resolution plate during preparation of a positive plate for color printing or a CMF (a color mosaic filter), etc. to be used for color display such as liquid crystal.

According to an aspect of the present invention, there is provided a light-transmissive recording medium having an ink receiving layer comprising a water-soluble polymer and a crosslinking agent on a light-transmissive substrate, wherein the polymer constituting said ink receiving layer has a crosslinking degree within the range of from the crosslinking degree satisfying the water resistance of the ink receiving layer in JIS K 5400 to the crosslinking degree giving the ink receiving capacity of 0.2 $\mu l/cm^2$ in the ink receiving layer.

According to another aspect of the present invention, there is provided a light-transmissive recording medium having an ink receiving layer comprising a water-soluble polymer and a crosslinking agent on a light-transmissive substrate, wherein the polymer constituting said ink receiving layer has a crosslinking degree within the range of from the crosslinking degree satisfying the water resistance of the ink receiving layer in JIS K 5400 to the crosslinking degree giving the ink receiving capacity of 0.2 $\mu l/cm^2$ in the ink receiving layer, and the linear transmittance is 10% or higher.

According to a further aspect of the present invention, there is provided a recording method which performs recording by forming droplets of a recording liquid and attaching said droplets onto a recording medium, said recording liquid is an aqueous ink and said recording medium is a light-transmissive recording medium having an ink receiving layer comprising a water-soluble polymer and a crosslinking agent on a light-transmissive substrate, wherein the polymer constituting said ink receiving layer has a crosslinking degree within the range of from the crosslinking degree satisfying the water resistance of the ink.

BRIEF DESCRIPTION OF THE DRAWING

The sole FIGURE in the drawing is a sectional view illustrating a recording medium of the present invention.

DETAILED DESCRIPTION OF THE PREFERRED EMBODIMENTS

Referring to the drawing, a recording medium of the present invention is depicted which comprises a substrate 1 as the supporting material and a light-transmissive recording surface, namely an ink receiving layer 2, provided on its surface, and is light-transmissive as a whole.

Also, according to another embodiment, the ink receiving layer may also have the function as the support.

The water-soluble polymer to be used in the present invention has reactive groups such as hydroxyl, carboxyl, sulfonic acid, amino, blocked isocyanate, acid anhydride, epoxy, and vinyl groups and the like.

The above water-soluble polymer may include, for example, natural polymers or modified products thereof such as albumin, gelatin, casein, starch, gum arabic, sodium alginate, hydroxyethyl cellulose, carboxylmethyl cellulose and the like; polyvinyl alcohol; complete or partial saponified products of copolymers of vinyl acetate and other monomers; homopolymers or copolymers with other monomers of unsaturated carboxylic acids such as (meth)acrylic acid, maleic acid, crotonic acid and the like; homopolymers or copolymers with other vinyl monomers of sulfonated vinyl monomers such as vinylsulfonic acid, sulfonated styrene and the like; homopolymers or copolymers with other vinyl monomers of (meth)acrylamide; homopolymers or copolymers with other monomers of ethylene oxide; terminated polyurethanes having blocked isocyanate groups; polyamides having such groups as mentioned above; polyethyleneimine; polyurethane; polyester; and so on. These can be used also as mixtures.

The water-soluble polymers having reactive groups as mentioned above are all known and readily available from the market.

In the present invention, the crosslinking agent to be used for crosslinking of the water-soluble polymer as described above is a compound which can form crosslinking bonds between the water-soluble polymers through the reaction with the water-soluble polymer as described above. Such a crosslinking bond may be either a covalent bond, ionic bond or van der Waals bond. Thus, in essence, it may be a bond which can suppress superfluous hydrophilicity by modification of the above water-soluble polymer.

Such a crosslinking agent may preferably be selected depending on the water-soluble polymer selected. For example, polyaldehyde compounds, polyepoxy compounds, polyisocyanate compounds, polycarboxylic acids, or acid anhydrides may be preferably used when the reactive group of the water-soluble polymer is a hydroxyl group. Polyamine compounds, polyisocyanate compounds, polyepoxy compounds, polyol compounds or polyvalent metal ions may be preferably used when the reactive group is a carboxyl group. For other reactive groups, the crosslinking agents can be selected and used on the basis of similar considerations.

Various kinds of the crosslinking agents as mentioned above are all known per se in the fields of paints and adhesives, and they are all readily available from the market.

In the recording medium of the present invention, the ink receiving layer is formed from a crosslinked polymer of the water-soluble polymer and the crosslinked polymer as described above, but care must be taken so that the crosslinked polymer obtained should not have an excessively crosslinked structure.

Excessive crosslinking will result in loss of hydrophilicity as well as solublity in a solvent, whereby the ink receiving layer can be formed with difficulty and the ink receiving layer formed becomes insufficient in ink receiving capacity.

Accordingly, the present inventors have made intensive efforts and consequently found that, by adjusting the crosslinking degree of the polymer constituting the ink receiving layer within the range higher than the crosslinking degree which satisfies the water resistance of the ink receiving layer in JIS K 5400 and lower than the crosslinking degree which makes the ink receiving capacity of the ink receiving layer 0.2 $\mu l/cm^2$, light-transmissive recording medium which satisfies water resistance and ink absorption characteristic at the same time and is yet excellent in dot density and conveying characteristic can be obtained, to accomplish the present invention.

The water resistance according to JIS K 5400 as herein mentioned is tested as follows. Four sheets of test film (about 150 mm × about 70 mm) are prepared, and each film is coated with an ink receiving layer and dried at 80° C. for 60 minutes, further at 120° C. for 10 minutes. For each one test strip, one 300 ml beaker is prepared, deionized water is charged into the beaker to the depth of 90 mm, in which the test film is immersed by suspending it by a clip and a strand with the upper end during drying being downward to the depth of about 80 mm, and left to stand at room temperature for 30 seconds. The test strip is taken out and immediately compared with the original test film for examination of the coating. The test strip is further left to stand in the room for 2 hours, and again the coating is examined. In these tests, the coating at the peripheral portions of the test strips and the portions within the width of about 10 mm from the water surface is disregarded from observation. When, for two strips of three test strips, no wrinkle, blister, fracture or peel-off is recognized on the coated surface in the first and the second observations, and also the extent of reduction in lustre, clouding or decoloration is not great in the second observation, it is appreciated as "no abnormality when immersed in water".

The term "ink receiving capacity per unit area" means the maximum volume of ink, when continuously increasing amounts of ink are attached on a constant surface area (1 cm$^2$) of the ink receiving layer and another paper is pressed against the surface on which the ink is attached after a certain elapse of time without transfer of ink onto the pressed paper.

More specifically, small ink droplets of 85 μm in diameter in number of, for example, some hundred to some thousand are attached onto the ink receiving layer according to the ink jet recording method, and after elapse of 20 minutes, another paper is pressed against the layer. The above ink receiving capacity can be determined by observing whether ink is attached onto the pressed paper.

The ink receiving capacity of 0.2 μl/cm$^2$ as herein mentioned is the value obtained when ink is attached onto a recording medium at a dot density of 620/cm$^2$.

The degree of crosslinking within the range as specified above can be controlled by choice of the water-soluble polymer and the crosslinking agent and their amounts, control of the film forming temperature, control of the amount of other uncrosslinked water-soluble polymers which may be used in combination and others.

Control of such a crosslinking degree cannot be done in a general manner, but differs depending on the water-soluble polymer employed. For example, in the case of a water-soluble polymer having relatively high solubility in water, about 0.1 to 100 parts by weight of a crosslinking agent is used per 100 parts by weight of the water-soluble polymer thereby to make the molecular weight per one crosslinking point preferably about 40 to 200,000. On the other hand, in the case of a water-soluble polymer having relatively low solubility in water, it is preferable to use about 0.01 to 50 parts by weight of a crosslinking agent per 100 parts by weight of the water-soluble polymer, thereby making the molecular weight per one crosslinking point preferably 100 to 500,000.

The water-soluble polymer for formation of the crosslinked polymer may preferably be one having a molecular weight of 500 or more, preferably 1,000 or more, so as to form a coating as strong as possible.

The reaction between the water-soluble polymer and crosslinking agent can be carried out very easily in any case, but if necessary the reaction can be accelerated by use of a known catalyst such as potassium hydroxide, sodium hydroxide, various tertiary amines, quaternary ammonium salts, alcohols, tin chloride, borofluorides and others.

The ink receiving layer of the recording medium of the present invention is formed by incorporating a crosslinked polymer as described above. In the present invention, as long as the objects of the present invention can be achieved, other than the crosslinked polymer as described above, various non-crosslinked water-soluble or hydrophilic polymers as mentioned above may be used in combination with the above crosslinked polymer.

Further, for reinforcement of strength and/or improvement of adhesion to substrate of the ink receiving layer, within the range which does not interfere with the objects of the present invention, hydrophobic resins such as SBR latex, NBR latex, polyvinyl formal, polymethyl methacrylate, polyvinyl butyral, polyacrylonitrile, polyvinyl chloride, polyvinyl acetate, phenol resin, alkyd resin may also be used in combination, if necessary.

For improvement of ink absorptivity of the ink receiving layer, it is possible to disperse fillers such as silica, clay, talc, diatomaceous earth, calcium carbonate, calcium sulfate, barium sulfate, aluminum silicate, synthetic zeolite, alumina, zinc oxide, lithopon, satin white, etc. in the ink receiving layer, to the extent such that the ink receiving layer does not lose necessary light-transmissive property.

As for the substrate to be used as the supporting material for the ink receiving layer in the present invention, it may be any transparent substrate known in the art. Preferable examples may include films or plates such as of polyester resin, diacetate resin, polycarbonate resin, polyvinyl chloride resin, polyimide resin, cellophane, celluloid, etc. and glass plates.

The recording medium of the present invention can be prepared by forming a light-transmissive ink receiving layer from the crosslinked polymer alone or a mixture thereof with other light-transmissive polymers on the light-transmissive substrate as described above.

In forming such an ink receiving layer, there may preferably be employed a method in which a coating solution is prepared by dissolving or dispersing the above crosslinked polymer or a mixture with another appropriate polymer and said solution is coated on the light transmissive substrate according to the known method such as roll coating, rod bar coating, spray coating, air knife coating, etc., followed by rapid drying, or a method in which one solution of either the water-soluble polymer or the crosslinking agent is applied and then the other solution, or alternatively a mixed solution of both is applied, to form a crosslinked polymer on the substrate. It is also possible to employ the method in which the above crosslinked polymer alone or a mixture with another polymer is subjected to hot melt coating or the method in which a single sheet for ink receiving layer is once formed from the material as described above, and said sheet is laminated on the above substrate.

In the present invention as described above, the ink receiving layer to be formed on the substrate may have a thickness, which is generally 1 to 200 μm, preferably 3 to 100 μm, more preferably 5 to 30 μm.

Further, in the present invention, by imparting organic or inorganic fine powder at a proportion which does not impair light-transmissive property of the recording medium, for example, in an amount of about 0.01 to about 1.0 g/m$^2$ on the recording surface of the light-transmissive recording medium as described above, the conveying characteristic within the printer, antiblocking characteristic during piling, fingerprint resistance, etc. of the recording medium obtained can be further improved The light-transmissive recording medium of the present invention is formed by use of the materials and the method as described above, and the recording medium is light transmissive as a whole, with both of the substrate and the ink receiving layer being light-transmissive.

The sufficient light transmissivity as herein mentioned means that the linear transmittance of the recording medium should desirably exhibit at least 10%.

If the linear transmittance is 10% or higher, the recorded image can be observed by projection by, for example, OHP onto a screen. Further, in order for the fine portion of the recorded image to be observed sharply, the linear transmittance should desirably be 30% or higher.

The linear transmittance T (%) as herein mentioned is a value which is determined by measuring the spectral transmittance of the linear light which enters a sample perpendicularly, transmits through the sample, passes through a slit on the light receiving side which is located at least 8 cm apart from the sample on the line extended from the incident light pathway and is received on a detector, by means of, for example, 323 Model Hitachi Automatic Recording Spectrophotometer (produced by Hitachi, Ltd.), further determining the Y value of tristimulus values of color and calculating from the following formula:

$$T = Y/Y_o \times 100 \quad (1)$$

T: linear transmittance
Y: Y value of sample
Yo: Y value of blank

Thus, the linear transmittance as mentioned in the present invention is relative to linear light, and it is different from diffuse transmittance (transmittance is determined so as to be inclusive of diffused light by providing an integrating sphere at the rear of a sample) or opacity (determined from the ratio of values when white and black backings are applied on the back of a sample) according to the method in which light transmissivity is evaluated with diffused light.

Since what becomes a problem in an instrument utilizing optical techniques is the behavior of linear light, it is particularly important to determine the linear transmittance of a recording medium in evaluation of the light transmissivity of the recording medium to be used in such an instrument.

For example, in the case of observing a projected image by an OHP, in order to obtain an image which is high in contrast between the recorded portion and the non-recorded portion, which is sharp and easy to see, it is demanded that the non-recorded portion in the projected image should be light, namely that the linear transmittance of the recording medium should be at a certain level or higher. In the test with a test chart in an OHP, for obtaining an image suited for the above purpose, the linear transmittance of the recording medium is required to be 10% or higher, preferably 30% or higher in order to obtain a sharper image. Therefore, the recording medium suited for this purpose is required to have a linear transmittance of at least 10%.

Having described above by referring to examples of typical embodiments of the light-transmissive recording medium of the present invention, the light-transmissive recording medium of the present invention will not of course be limited to these embodiments. In either of these embodiments, provided that the crosslinking degree of the water-soluble polymer is within the above range, it can further incorporate various known additives, including dispersing agents, fluorescent dyes, pH controllers, antifoaming agents, lubricants, preservatives, surfactants, etc.

The recording medium of the present invention is not necessarily required to be colorless, so long as it is light-transmissive, but it may also be a colored recording medium.

Further, in the present invention, by applying if necessary surface treatment known in the art, a recording medium excellent in lustre not found in the recording medium for ink jet recording can also be obtained.

The recording medium of the present invention can exhibit excellent ink receptivity similarly as that having an ink receiving layer formed with a water-soluble polymer of the prior art and provide a recorded image of excellent sharpness, and yet with its surface being not becoming tacky or sticky and also being free from blocking or color transfer even when piled up.

Thus, to say nothing about mono-color, even when inks with different colors in full-color image recording may be attached on the same spot to overlap each other within a short time, there is no such phenomenon as flow-out or ooze-out, whereby the ink receiving layer will not be lowered and there can be obtained an image which is sharp with high resolution. Moreover, since the recording medium of the present invention has sufficient light transmittance, it is useful for observation by projection of a recorded image by an optical instrument such as a slide, an OHP, etc., a color resolution plate during preparation of a positive plate for color printing, or CMF, etc. to be used for color display such as liquid crystal, etc.

Such excellent effects under highly humid conditions may be considered to result from an appropriate network structure of the crosslinked polymer used for formation of ink receiving layer, thus exhibiting excellent water resistance even under highly humid conditions, while retaining high ink receptivity.

It has been entirely unexpected that such excellent effects as described above can be accomplished by a crosslinked water-insoluble polymer. This may be considered to be due to the fact that the ink consisting of a water-polyhydric alcohol mixture system will promote reception of ink imparted by temporarily dissolving or swelling the ink receiving layer of the recording medium without lowering its film strength and, after reception, the ink receiving layer will be returned to the original water-insoluble crosslinked polymer through absorption and evaporation of moisture. Such a theory is a mere speculation and will be in no way restrictive of the present invention.

The present invention is described in more detail by referring to the following Examples, in which parts are based on weight.

EXAMPLE 1

As a light transmissive substrate, a polyethylene terephthalate film with a thickness of 100 μm (produced by Toray) was employed, and a coating solution having the composition shown below was coated onto this film to give a dry film thickness of 8 μm according to the bar coater method, and dried under the conditions of 80° C. and 60 minutes, further under the conditions of 120° C. and 10 minutes, to give a light transmissive recording medium of the present invention.

| | |
|---|---|
| Polyvinyl alcohol (PVA-405, produced by Kuraray) | 10 parts |
| Glycerol polyglycidyl ether (DENACOL EX-313, produced by Nagase Kasei Kogyo) | 2 parts |
| 45% zinc borofluorides solution <Zn(BF$_4$)$_2$, reagent grade> | 0.2 parts |
| Water | 90 parts |

The recording medium of the present invention thus obtained was found to be colorless and transparent.

EXAMPLES 2-3 AND COMPARATIVE EXAMPLES 1-3

By use of the compositions as shown below, coating solutions were prepared and 3 kinds of light transmissive recording media of the present invention and 3 kinds of recording media for comparative purpose were obtained by forming an ink receiving layer on the same polyethylene terephthalate film as used in Example 1 in the same manner as in Example 1.

EXAMPLE 2

| | |
|---|---|
| Polyacrylic acid (JURYMER-AC-10p, produced by Nippon Junyaku) | 5 parts |
| Polyethylene glycol (MCROGOL 6000, produced by Nippon Yushi) | 5 parts |
| Water | 90 parts |
| (dried at 80° C. for 20 minutes). | |

EXAMPLE 3

| | |
|---|---|
| Polyvinyl alcohol (PVA-217, produced by Kuraray) | 5 parts |
| Polyvinyl methyl ether/maleic anhydride copolymer (GANTREZ AN-169, produced by GAF) | 5 parts |
| 5% aqueous ammonia solution | 2 parts |
| Water | 90 parts |
| (dried at 80° C. for 10 minutes and further at 100° C. for 40 minutes) | |

COMPARATIVE EXAMPLE 1

| | |
|---|---|
| Polyvinyl alcohol (PVA-217, produced by Kuraray) | 10 parts |
| Water | 90 parts |
| (Drying conditions: 80° C., 15 minutes) | |

COMPARATIVE EXAMPLE 2

| | |
|---|---|
| Polyvinyl alcohol (PVA-217, produced by Kuraray) | 10 parts |
| Glyoxal | 0.5 parts |
| Water | 90 parts |
| (Drying conditions: 80° C. 15 minutes) | |

COMPARATIVE EXAMPLE 3

| | |
|---|---|
| Methyl cellulose (Metrose SM-100, produced by Shin-etsu Kagaku) | 10 parts |
| Epichlorohydrin type resin, Kywene 234 produced by Hercules) | 2 parts |
| Hydrochloric acid | 0.05 parts |
| Water | 88 parts |
| (Drying conditions: 130° C. 30 minutes) | |

On the recording media of the above Examples and Comparative examples, ink jet recording was practiced by use of the four kinds of ink as shown below by means of a recording device having an on-demand type ink jet recording head which discharges ink by a piezoelectric vibrator (discharge orifice diameter: 60 μm, piezoelectric vibrator driving voltage: 70 V, frequency 2 KHz).

| | |
|---|---|
| Yellow ink (composition) | |
| C.I. Direct Yellow 86 | 2 parts |
| Diethylene glycol | 20 parts |
| Polyethylene glycol #200 | 10 parts |
| Water | 70 parts |
| Red ink (composition) | |
| C.I. Acid Red 35 | 2 parts |
| Diethylene glycol | 20 parts |
| Polyethylene glycol #200 | 10 parts |
| Water | 70 parts |
| Blue ink (composition) | |
| C.I. Direct Blue 86 | 2 parts |
| Diethylene glycol | 20 parts |
| Polyethylene glycol #200 | 10 parts |
| Water | 70 parts |
| Black ink (composition) | |
| C.I. Food Black 2 | 2 parts |
| Diethylene glycol | 20 parts |
| Polyethylene glycol #200 | 10 parts |
| Water | 70 parts |

The results of evaluation of the recording media of Examples and Comparative examples are shown in Table 1.

TABLE 1

| | Example | | |
|---|---|---|---|
| | 1 | 2 | 3 |
| Ink fixing time | 3 min. | 5 min. | 3 min. |
| Dot density | 1.2 | 1.1 | 1.0 |
| OHP adaptability | O | O | O |
| Linear transmittance | 80% | 78% | 80% |
| Ink receiving capacity | O | O | O |
| Conveying characteristic | O | O | O |
| Image sharpness | O | O | O |
| Water resistance | O | O | O |

| | Comparative example | | |
|---|---|---|---|
| | 1 | 2 | 3 |
| Ink fixing time | 3 min. | 120 min. | 1 day |
| Dot density | 1.1 | 1.1 | 1.1 |
| OHP adaptability | O | O | O |
| Linear transmittance | 82% | 82% | 80% |
| Ink receiving capacity | O | x | x |
| Conveying characteristic | x | | |
| Image sharpness | O | x | x |

TABLE 1-continued

| Water resistance | x |
|---|---|

The respective evaluation items in Table 1 were measured following the methods as described below.

(1) Ink fixing time was determined by leaving the recording medium after recording to stand under room temperature (20° C., 65% RH), and measuring the time until ink was dried and sticked to the finger no longer, when the recorded image was touched with a finger.

(2) Dot density was measured for black dots by means of Sakura Microdensitometer PDM-5 (produced by Konishiroku Photo Industry K.K.) by applying JIS K7505 for printed microdots.

(3) OHP adaptability was measured as a typical example of an optical instrument. The recorded image was projected by an OHP onto a screen, and judged by visual observation. One which could provide a projected image which was light at non-recorded portion, high in OD (optical density) of recorded image, sharp and easy to see with high contrast was rated as ○ ; one which can provide a projected image which was slightly dark at non-recorded portion, slightly low in OD of recorded image and not clearly discriminable between the lines with a pitch width of 0.5 mm and a boldness of 0.25 mm was rated as Δ; one which can provide a projected image which was considerably dark at non-recorded portion, considerably low in recorded image and not clearly discriminable between the lines with a pitch width of 1 mm and a boldness of 0.3 mm, or which was indiscriminable between non-recorded portion and recorded image, was rated as x.

(4) Linear transmittance was determined by measuring the spectral transmittance by means of 323 Model Hitachi Automatic Recording Spectrophotometer (produced by Hitachi, Ltd.) while maintaining the distance from the sample to the window on the light receiving side at about 9 cm and calculating from the above formula (1).

(5) Ink receiving capacity per unit area was determined by attaching ink under the state of minute droplets of 85 $\mu$m in diameter in number of 620/cm$^2$, namely at a density of 0.2 $\mu$l/cm$^2$, according to the ink jet recording method under the conditions of 20° C., 65 RH to each sample and, 20 minutes later, and tested for ink receiving capacity by pressing an ink jet recording paper (L paper produced by Mitsubishi Seishi) against said attached portion. When no unfixed ink was attached on the pressed ink jet recording paper, namely when the sample was capable of receiving ink at a density of 0.2 $\mu$l/cm$^2$ or higher, it was rated as ○ , while the case when it is not so is rated as x.

(6) Conveying performance was rated as x, when the recording medium could not be conveyed with the delivery roller of the printer due to stickiness on the ink receiving layer surface when it was mounted on the printer under the conditions of 35° C. and 85% RH, or otherwise as ○ .

(7) Image sharpness was rated as x, when the image was disturbed and lacked sharpness because of mixing of ink droplets attached on the same spot or adjacent to each other, flowing-out of ink, or formation of irregularity on account of delayed drying of ink due to insufficient ink receiving capacity, by visual observation of the ink jet recorded image, or the image excellent in color formation of ink and little in image disturbance was rated as ○ .

(8) Water resistance is the water resistance as defined by JIS K 5400, and it was evaluated by absence of wrinkle, blister, fracture, peel-off, etc. when a coating formed to a thickness of 5 to 10 $\mu$m on a polyethylene terephthalate film was immersed in water for 30 seconds as being ○ , or otherwise as x.

We claim:

1. A light-transmissive recording medium comprising a light transmissive substrate and an ink-receiving layer on the light transmissive substrate, said ink-receiving layer comprising a water-soluble polymer crosslinked with a crosslinking agent, and said ink-receiving layer having a water resistance meeting the standards of JIS K 5400 and an ink-receiving capacity of at least 0.2 $\mu$l/cm$^2$.

2. A light-transmissive recording medium according to claim 1, wherein said water-soluble polymer has an average molecular weight of 500 or more.

3. A light-transmissive recording medium according to claim 1, wherein said water-soluble polymer has an average molecular weight of 40 to 500,000 per one crosslinking point.

4. A light-transmissive recording medium according to claim 1, wherein 0.01 to 100 parts by weight of the crosslinking agent is contained per 100 parts by weight of the water-soluble polymer.

5. A light-transmissive recording medium according to claim 1, wherein said crosslinking agent is selected from the group consisting of polyaldehyde compounds, polyepoxy compounds, polyisocyanate compounds, polycarboxylic acids, acid anhydrides, polyamine compounds, polyol compounds and polyvalent metal ions.

6. A light-transmissive recording medium according to claim 1, wherein said ink receiving layer has a thickness of 1 to 200 $\mu$m.

7. A light-transmissive recording medium according to claim 1, wherein said light-transmissive substrate is selected from the group consisting of films of polyester type resins, diacetate type resins, triacetate type resins, acrylic resins, polycarbonate type resins and polyvinyl chloride type resins, and glass plates.

8. A light-transmissive recording medium according to claim 1, wherein the water-soluble polymer has at least one radical selected from the group consisting of hydroxyl, carboxyl, sulfonic, amino, blocked isocyanate, acid anhydride, epoxy and vinyl radicals.

9. A light-transmissive recording medium according to claim 1 wherein the ink-receiving layer has a thickness of from 3 to 100 microns.

10. A light-transmissive recording medium according to claim 1 wherein the ink-receiving layer has a thickness of from 5 to 30 microns.

11. A light-transmissive recording medium comprising a light transmissive substrate and an ink-receiving layer on the light transmissive substrate, said ink-receiving layer comprising a water-soluble polymer crosslinked with a crosslinking agent, and said ink-receiving layer having a water resistance meeting the standards of JIS K 5400, an ink-receiving capacity of at least 0.2 $\mu$l/cm$^2$ and a linear transmittance of 10% or higher.

12. A light-transmissive recording medium according to claim 11, wherein the linear transmittance is 30% or higher.

13. A light-transmissive recording medium according to claim 11, wherein said water-soluble polymer has an average molecular weight of 500 of more.

14. A light-transmissive recording medium according to claim 11, wherein said-water soluble polymer has an average molecular weight of 40 to 500,000 per one crosslinking point.

15. A light-transmissive recording medium according to claim 11, wherein 0.01 to 100 parts by weight of the crosslinking agent is contained per 100 parts by weight of the water-soluble polymer.

16. A light-transmissive recording medium according to claim 11, wherein said crosslinking agent is selected from the group consisting of polyaldehyde compounds, polyepoxy compounds, polyisocyanate compounds, polycarboxylic acids, acid anhydrides, polyamine compounds, polyol compounds and polyvalent metal ions.

17. A light-transmissive recording medium according to claim 11, wherein said ink receiving layer has a thickness of 1 to 200 μm.

18. A light-transmissive recording medium according to claim 11, wherein said light-transmissive substrate is selected from the group consisting of films of polyester type resins, diacetate type resins, triacetate type resins, acrylic resins, polycarbonate type resins and polyvinyl chloride type resins, and glass plates.

19. A light-transmissive recording medium according to claim 11, wherein the water-soluble polymer has at least one radical selected from the group consisting of hydroxyl, carboxyl, sulfonic, amino, blocked isocyanate, acid anhydride, epoxy and vinyl radicals.

20. A light-transmissive recording medium according to claim 11 wherein the ink-receiving layer has a thickness of from 3 to 100 microns.

21. A light-transmissive recording medium according to claim 11 wherein the ink-receiving layer has a thickness of from 5 to 30 microns.

22. A recording method comprising forming droplets of a recording liquid and attaching said droplets onto a recording medium, wherein said recording liquid is an aqueous ink and said recording medium is a light transmissive recording medium comprising a light transmissive substrate and an ink-receiving layer on the light transmissive substrate, said ink-receiving layer comprising a water-soluble polymer crosslinked with a crosslinking agent, and said ink-receiving layer having a water resistance meeting the standards of JIS K 5400 and an ink-receiving capacity of at least 0.2 μl/cm².

23. A recording method according to claim 22, wherein said water-soluble polymer has an average molecular weight of 500 or more.

24. A recording method according to claim 22, wherein said water-soluble polymer has an average molecular weight of 40 to 500,000 per one crosslinking point.

25. A recording method according to claim 22, wherein 0.01 to 100 parts by weight of the crosslinking agent is contained per 100 parts by weight of the water-soluble polymer.

26. A recording method according to claim 22, wherein said crosslinking agent is selected from the group consisting of polyaldehyde compounds, polyepoxy compounds, polyisocyanate compounds, polycarboxylic acids, acid anhydrides, polyamine compounds, polyol compounds and polyvalent metal ions.

27. A recording method according to claim 22, wherein said ink receiving layer has a thickness of 1 to 200 μm.

28. A recording method according to claim 22, wherein said light-transmissive substrate is selected from the group consisting of films of polyester type resins, diacetate type resins, triacetate type resins, acrylic resins, polycarbonate type resins and polyvinyl chloride type resins, and glass plates.

29. A recording method according to claim 22, wherein said recording medium has a linear transmittance of 10% or higher.

30. A recording method according to claim 22, wherein said recording medium has a linear transmittance of 30% or higher.

31. A recording method according to claim 22, wherein the water-soluble polymer has at least one radical selected from the group consisting of hydroxyl, carboxyl, sulfonic, amino, blocked isocyanate, acid anhydride, epoxy and vinyl radicals.

32. A recording method according to claim 22, wherein the ink-receiving layer has a thickness of from 3 to 100 microns.

33. A recording method according to claim 22, wherein the ink-receiving layer has a thickness of from 5 to 30 microns.

* * * * *

UNITED STATES PATENT AND TRADEMARK OFFICE
CERTIFICATE OF CORRECTION

PATENT NO. : 4,701,837
DATED : October 20, 1987
INVENTOR(S) : MAMORU SAKAKI, ET AL.

It is certified that error appears in the above-identified patent and that said Letters Patent is hereby corrected as shown below:

COLUMN 1

Line 35, "ink" should read --ink jet--.

COLUMN 3

Line 47, after "ink" insert --receiving layer--.

COLUMN 8

Line 32, "being not" should read --not--.

COLUMN 10

Table 1, line 67, "Conveying characteristic    X             " should read --Conveying characteristic    X  O  O--.

UNITED STATES PATENT AND TRADEMARK OFFICE
CERTIFICATE OF CORRECTION

PATENT NO. : 4,701,837

DATED : October 20, 1987

INVENTOR(S) : MAMORU SAKAKI, ET AL.

It is certified that error appears in the above-identified patent and that said Letters Patent is hereby corrected as shown below:

COLUMN 11

Table 1, line 2, "Water resistance    X            "
should read --Water resistance    X  ◯ ◯ --.
Line 46, "and" (second occurrence) should be deleted.

Signed and Sealed this

Fourteenth Day of June, 1988

Attest:

DONALD J. QUIGG

Attesting Officer

Commissioner of Patents and Trademarks